(No Model.) 2 Sheets—Sheet 1.
O. BATES.
KITCHEN CABINET.
No. 362,704. Patented May 10, 1887.
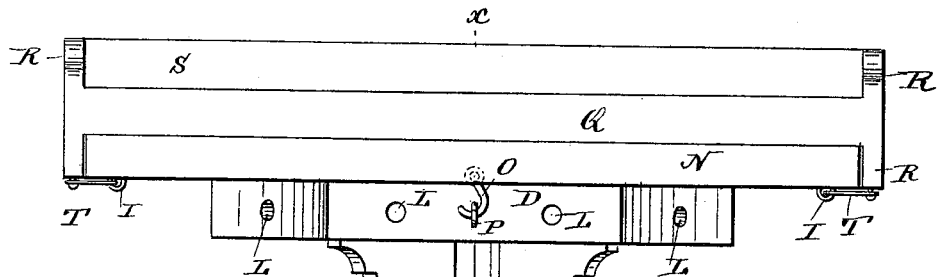
Fig. 1.
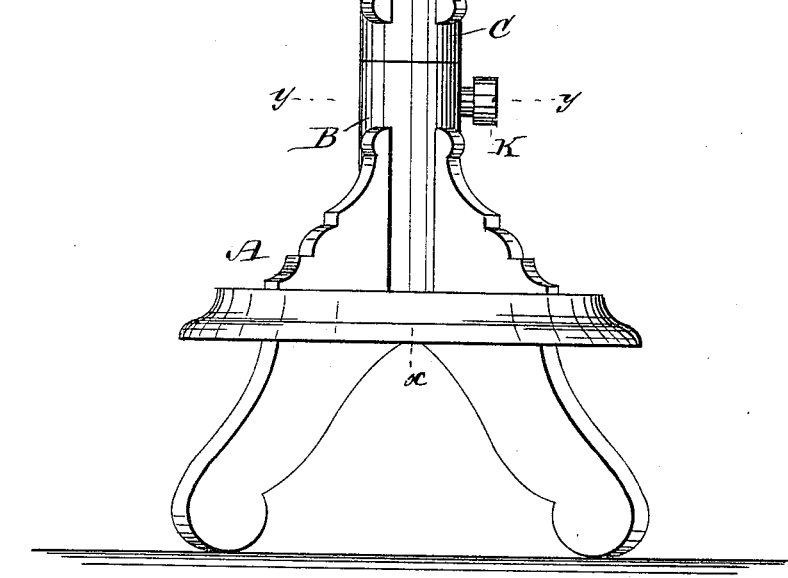
Fig. 2.
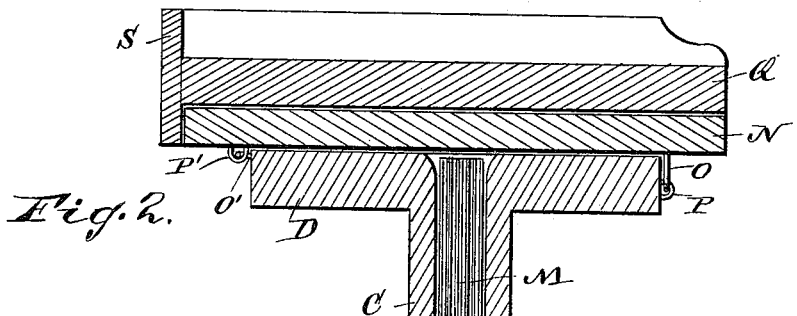
WITNESSES:
Theo. G. Hoster
C. Sedgwick
INVENTOR:
O. Bates
BY Munn & Co.
ATTORNEYS.

(No Model.)
2 Sheets—Sheet 2.
O. BATES.
KITCHEN CABINET.
No. 362,704. Patented May 10, 1887.
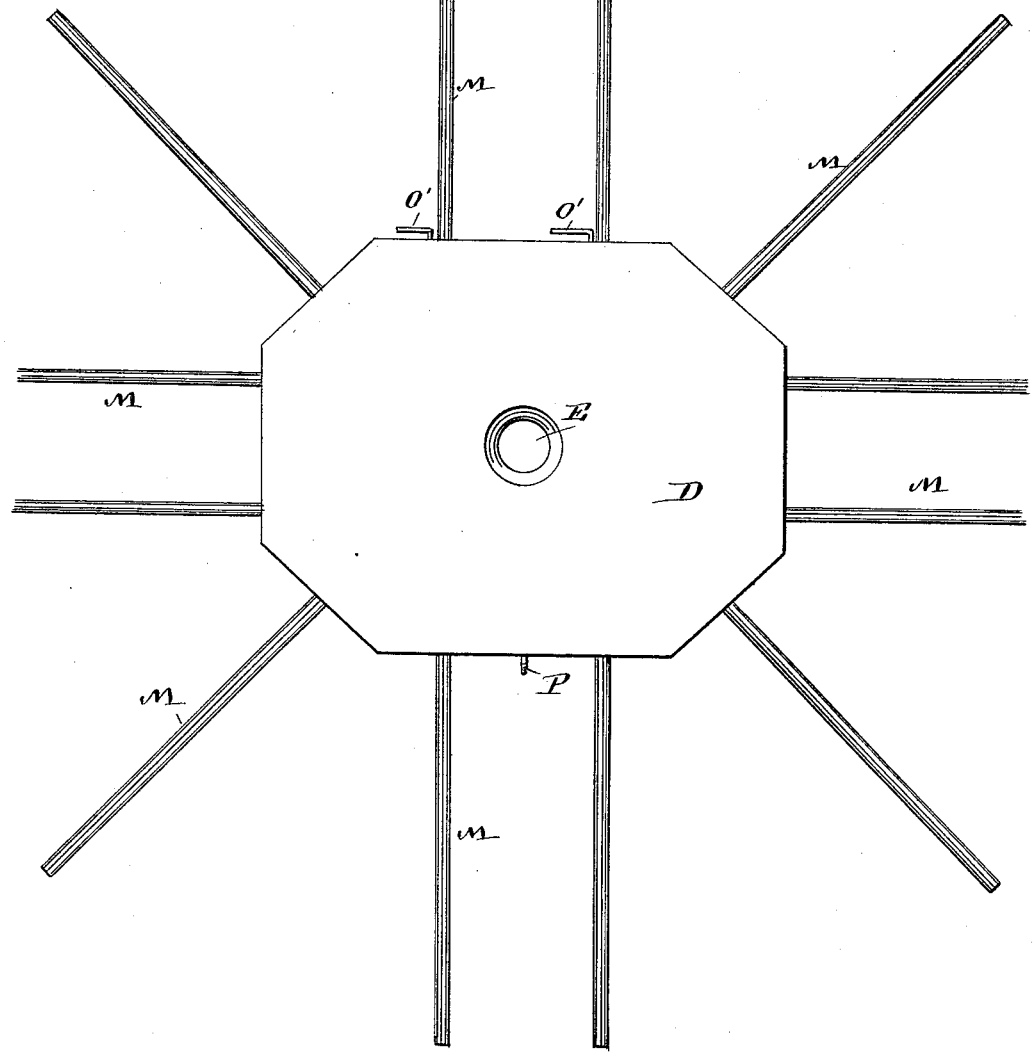

UNITED STATES PATENT OFFICE.

ORREN BATES, OF WETMORE, KANSAS, ASSIGNOR TO HIMSELF AND LUNDY J. ROTE, OF SAME PLACE.

KITCHEN-CABINET.

SPECIFICATION forming part of Letters Patent No. 362,704, dated May 10, 1887.

Application filed December 2, 1885. Serial No. 184,383. (No model.)

*To all whom it may concern:*

Be it known that I, ORREN BATES, of Wetmore, in the county of Nemaha and State of Kansas, have invented a new and useful Improvement in Kitchen-Cabinets, of which the following is a full, clear, and exact description.

The object of my invention is to provide a new and improved kitchen-cabinet which is simple in construction and which can be adjusted for different purposes, as may be necessary.

The invention consists in the construction and combination of parts and details, as will be fully described and set forth hereinafter, and then pointed out in the claims.

Reference is to be had to the accompanying drawings, forming a part of this specification, in which similar letters of reference indicate corresponding parts in all the figures.

Figure 1 is a side view of my improved kitchen-cabinet. Fig. 2 is a cross-sectional view of the same on the line *x x*, Fig. 1, parts being broken out. Fig. 3 is a plan view of the same adjusted as a clothes-rack. Fig. 4 is a sectional detail plan view of the same on the line *y y*, Fig. 1.

On the base A, of any suitable construction, the tubular standard B is erected, in which the lower narrowed end of the tube C passes, to the upper end of which the top plate D is secured permanently. The top plate D is provided with the central aperture, E, which communicates with the upper end of the tube C, the upper ends of the bore of the said tube being rounded off, as shown.

The tube C is provided in its lower part with the longitudinal slot F, through which the piece G passes, which is provided on its inner end with the cross-piece H, resting against the inner surface of the said tube C, and from which piece G the screw J passes through an aperture in the tubular standard B, and on the outer end of the said screw J the headed nut K is screwed.

The top plate D is preferably made octagonal, but may be hexagonal, or may have any other suitable shape desired, and is provided in its edges or rim with the apertures L, for receiving the ends of the rods M, which are placed in the tube C when not in use, as shown in Fig. 2.

On the top plate D the table-top plate N is placed, and is held in place by the hook O on the under side of the said plate N and the eye P on the edge of the said top plate and by the hooks O' on the edge of the top plate D and the eyes P' on the plate N. On the table-top plate N the plate Q is placed, which is provided with the end and side ledges, R and S, projecting from the top and bottom surfaces of the said plate Q. The plate Q is held on the plate N by the hooks T on the bottom edges of the end ledges, R, and the eyes I on the under side of the plate N.

In place of the hooks and eyes O' P' any other hinge may be used.

The cabinet is adjusted in the following manner: When it is to be used as a clothes-drier, the top plates N and Q are removed and the ends of the rods M are placed in the apertures L in the rim of the top plate D, to project radially from the same, as shown in Fig. 3, the clothes being hung on the said rods. When the cabinet is to be used as an ordinary table, the top plate N is placed on the top plate D and secured by means of the devices described, or by other suitable devices. When the cabinet is to be used for making dough or for a similar purpose, the top plate Q is placed on the top plate N and is secured by means of the devices described, or by means of other suitable devices. When the nut K is loosened, the tube C can be raised more or less in the tube B, and when the top plate is raised to the desired height the tube C can be locked in the tube B by tightening the nut K. The cabinet occupies very little space, can easily be adjusted for its different uses, is strong and durable, and has a neat appearance.

Having thus fully described my invention, I claim as new and desire to secure by Letters Patent—

1. The kitchen-cabinet consisting of the tubular standard containing rods and having the top or plate provided with a series of apertures to receive said rods, a second enlarged top or plate removably connected to the aforesaid top or plate, and a third top or plate removably connected to the second top or plate and provided with side and end ledges projecting beyond its upper and lower surfaces, substantially as and for the purpose set forth.

2. The combination, with a standard, of the top plate D on the same, the removable plate N, held by fastening devices on the plate D, and the plate Q, held on the plate N by suitable fastening devices and provided with ledges, substantially as herein shown and described.

ORREN BATES.

Witnesses:
E. CAMPFIELD,
JNO. W. PETERS.